Figure 1:
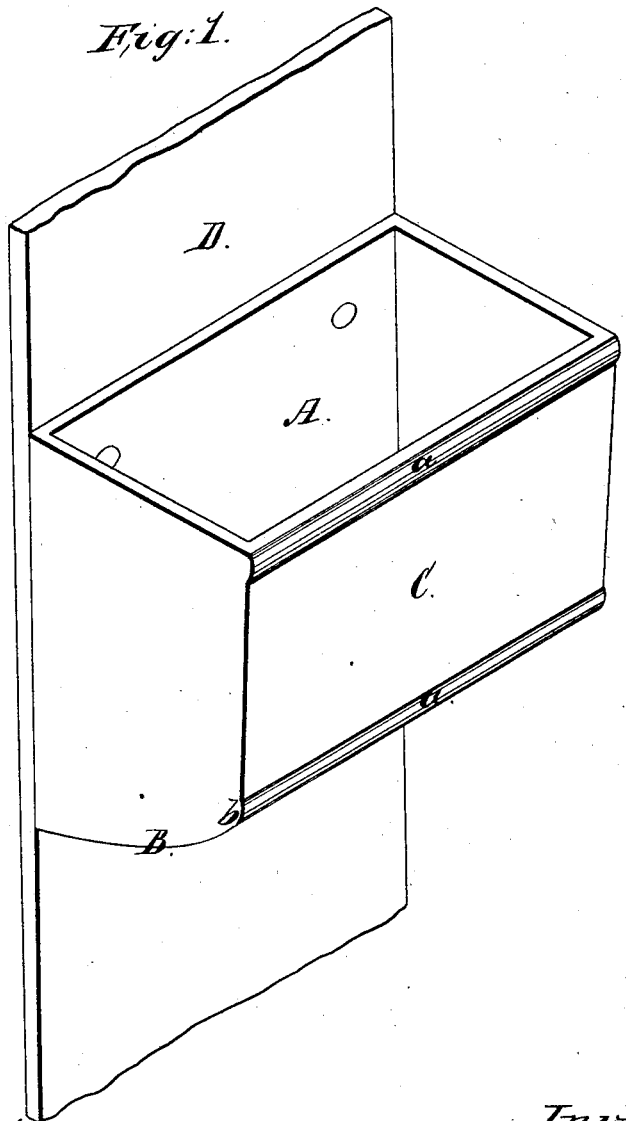

L. B. Prindle,
Hoisting Bucket.

Nº 35,111.   Patented Apr. 29, 1862.

Witnesses:
Nelson W. Northrup
L. F. Callan

Inventor:
L. B. Prindle
By Attorney J. B. Woodruff

UNITED STATES PATENT OFFICE.

LYMAN B. PRINDLE, OF LITCHFIELD, CONNECTICUT.

IMPROVEMENT IN CUPS FOR ELEVATORS OF FLOURING-MILLS.

Specification forming part of Letters Patent No. 35,111, dated April 29, 1862.

*To all whom it may concern:*

Be it known that I, LYMAN B. PRINDLE, of the town and county of Litchfield, in the State of Connecticut, have invented a new and useful article of manufacture (or design) in Elevator-Cups for Flouring-Mills and Store-Houses; and I do hereby declare that the following is a clear and exact description of the same, reference being had to the accompanying drawing, making a part of this specification.

My invention consists in making cups of malleable cast-iron with guards cast on the front to protect the cup and diminish the friction while running, the same being attached to an endless belt for elevating grain, meal, and flour in flouring-mills and store-houses.

To enable others skilled in the art to make and use my invention, I will proceed to describe it more fully, referring to the drawing and the letters of reference marked thereon.

I make the cup A of malleable iron, cast in one piece, of the desired size and form, the bottom B being curved to favor the passing over and around the pulleys. On the front or outside c, I make two flat ribs or guards, a a', extending crosswise, one at the top edge or rim and the other at the point where the curve b begins. The guards a a' decrease the friction of the elevator, while running, in proportion to the small surface they present to the trough or box they run in while grain, meal, or flour is being carried up by them. The cups A thus constructed are riveted to an endless belt, D, in the ordinary manner, and the number to be used will vary according to quantity of material to be elevated and the distance it is to be carried. Thus a good, smooth, substantial, and durable cup is no inconsiderable item in the cost and construction of large flouring-mills, and the wear and expense of keeping the elevators in repair, of such construction as have heretofore been known and used, is the greatest item in proportion to their cost of anything connected with milling-machinery. Those made of leather, tin, or any sheet metal do not last but a few months at the longest, and are constantly becoming disarranged and occasionally the cause of doing much damage and stopping the mill. By my improvement in the construction, which I claim to be a new article of manufacture in elevating-cups, I have tested them long enough to be satisfied of their great utility and immense superiority over all others of any material or description. For durability they may be relied on to last as long as any other parts of the mill.

I do not present the subject-matter of my invention so much for the novelty of the structure as for the economy and utility of its use.

Having thus described my invention, its adaptation, practical effects, and usefulness, what I claim as a new article of manufacture, and desire to secure by Letters Patent, is—

As a new article of manufacture and sale, making elevating-cups of malleable cast-iron, for the purposes herein set forth.

LYMAN B. PRINDLE.

Witnesses:
ABNER LANDON,
S. R. SPERRY.